United States Patent
Mishra et al.

(10) Patent No.: US 8,751,603 B2
(45) Date of Patent: Jun. 10, 2014

(54) EXPLOITING CLUSTER AWARENESS INFRASTRUCTURE THROUGH INTERNET SOCKET BASED APPLICATIONS

(75) Inventors: Rajeev Mishra, Karnataka (IN); Lance W. Russell, Rosanksy, TX (US); Sivakumar Krishnasamy, Tamil Nadu (IN); Krishnan Uma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 428 days.

(21) Appl. No.: 13/245,281

(22) Filed: Sep. 26, 2011

(65) Prior Publication Data

US 2013/0080572 A1 Mar. 28, 2013

(51) Int. Cl.
 *G06F 15/16* (2006.01)
(52) U.S. Cl.
 USPC ........... 709/217; 709/220; 709/224; 370/216; 370/316
(58) Field of Classification Search
 USPC ................... 709/217, 220, 224; 370/216, 316
 See application file for complete search history.

(56) References Cited

U.S. PATENT DOCUMENTS

| | | | |
|---|---|---|---|
| 6,895,590 B2 | 5/2005 | Yadav | |
| 7,551,614 B2 | 6/2009 | Teisberg et al. | |
| 7,978,716 B2 * | 7/2011 | Rao et al. | 370/401 |
| 2006/0075119 A1 * | 4/2006 | Hussain et al. | 709/227 |
| 2010/0023626 A1 * | 1/2010 | Hussain et al. | 709/227 |
| 2010/0061378 A1 * | 3/2010 | Joyner et al. | 370/395.53 |

OTHER PUBLICATIONS

Devesh Sharma; "Supporting OFED over Non-InfiniBand SANs"; 10th IEEE/ACM International Conference on Cluster, Cloud and Grid Computing; 2010; pp. 573-574; Hardware Technology Development Group, Center for Development of Advanced Computing; Pune, India.

* cited by examiner

*Primary Examiner* — Khanh Dinh
(74) *Attorney, Agent, or Firm* — Matthew B. Talpis; Gregory K. Goshorn; Greg Goshorn, P.C.

(57) ABSTRACT

Provided are techniques related generally to computer communication and, more specifically, to techniques that provide legacy applications with access to a cluster infrastructure. A pseudo interface layer provides applications with internet protocol (IP) family sockets access to cluster awareness protocols in a manner that may be transparent to both the application and the cluster awareness layer of a kernel.

20 Claims, 6 Drawing Sheets

EXPLOITING CLUSTER AWARENESS INFRASTRUCTURE THROUGH INTERNET SOCKET BASED APPLICATIONS

BACKGROUND OF THE INVENTION

The claimed subject matter relates generally to computer communication and, more specifically, to techniques that provide legacy applications with access to a cluster infrastructure.

SUMMARY

Provided are techniques that enable legacy socket based applications to access a cluster infrastructure. Various methods have been developed to create high bandwidth, fault-tolerant communication connections. Two examples are EtherChannel and multi-link interfaces, both of which employ one corresponding type of underlying communication hardware such as, but not limited to, Ethernet Network Interface Cards (NICs), InfiniBand cards, etc.

One technique, based on the AIX operating system, developed by International Business Machines Corporation of Armonk, N.Y. is called cluster awareness. In cluster awareness, an application may exploit different types of underlying hardware interfaces for communication such as, but not limited to, NICs, storage interfaces and InfiniBand interfaces.

Provided are techniques for providing a cluster specific interface device connected to a plurality of communication channels, each channel corresponding to underlying hardware; coupling the cluster specific interface device to a pseudo interface device without underlying communication hardware; configuring the pseudo interface device with an internet protocol (IP) address; generating a first communication link between an application and the pseudo interface device, wherein the first communication link is bound to the IP address; receiving at the pseudo interface device an application packet from the application on the first communication link; generating a cluster interface packet by converting the application packet to a protocol corresponding to the cluster specific interface device; generating a hardware specific packet corresponding to a particular one of the underlying hardware based upon the cluster interface packet; and transmitting the cluster interface packet via the cluster interface device to the particular hardware via the corresponding communication channel.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE DRAWINGS

A better understanding of the claimed subject matter can be obtained when the following detailed description of the disclosed embodiments is considered in conjunction with the following figures, in which:

DETAILED DESCRIPTION

Figure 1:
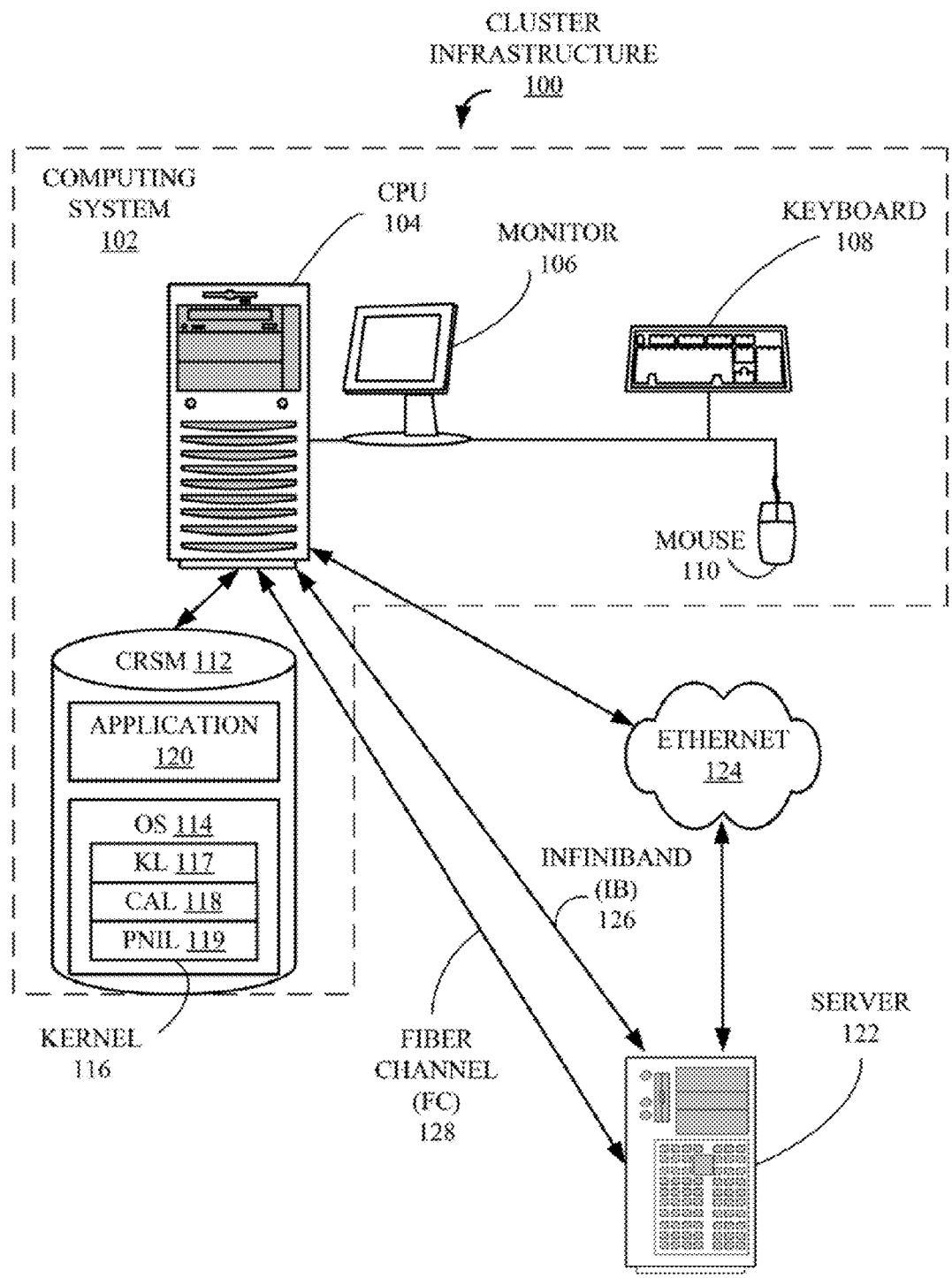
FIG. 1 is a block diagram of a cluster infrastructure that may utilize the claimed subject matter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc. or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational actions to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As the Inventors herein have realized, current techniques for high bandwidth, fault tolerant communication links each typically utilize one type of underlying communication hardware. Such configurations are prone to failure because a problem that causes one link to fail may likely also cause other links of the same type to fail as well. In addition, a socket application interface only enables an application to communicate with one hardware interface at a time. Within a cluster architecture, it is common of different nodes to have different types of hardware interfaces and yet an application must know what type of interface to employ with any particular node. The claimed subject matter is able to break these paradigms by enabling one application socket to communicate with, for example, a node over Ethernet and another cluster node over a storage network.

The existing AIX cluster awareness addresses some of these issues by enabling applications to both aggregate communication links and also utilize different types of underlying hardware interfaces. However, cluster awareness may only be employed if an application is written, or re-written, to handle a specific family of sockets, i.e. an AF_CLUST socket, which may not be easy to adopt in existing, or legacy, production environments because AF_CLUST sockets have a different addressing scheme and semantics than a typical socket. The existence of numerous interne socket based applications mandates that any solution to the issues described herein work with only minimal changes to existing applications. The disclosed technology enables applications to communicate with cluster devices, even devices not configured to communicate via sockets, using a standard internet socket family.

FIG. 1 is a block diagram of a simple cluster infrastructure 100 that may utilize the claimed subject matter. A computing system 102 includes a central processing unit (CPU) 104, which may include one or more processors (not shown), coupled to a monitor 106, a keyboard 108 and a pointing device, or "mouse," 110, which together facilitate human interaction with cluster infrastructure 100 and computing system 102. Also included in computing system 102 is a computer-readable storage medium (CRSM) 112, which may either be incorporated into client system 102 i.e. an internal device, or attached externally to computing system 102 by means of various, commonly available connection devices such as but not limited to, a universal serial bus (USB) port (not shown). CRSM 112 is illustrated storing an operating system (OS) 114 and a computer software application 120 that is used as an example throughout the Specification of an element that may take advantage of the claimed subject matter. OS 114 includes a kernel 116, which includes several components, i.e. kernel logic 117, cluster awareness logic (CAL) 118 and a Pseudo Network Interface Layer 119. It should be noted that a typical computing system would include more than one application, but for the sake of simplicity only one is shown. Components 117, 118 and 119 are described in more detail below in conjunction with FIGS. 2-6.

Computing system 102 is connected to a server 122 by means of several types of connections, i.e. an Ethernet 124, an InfiniBand (IB) connection 126 and a fiber Channel (FC) 128. It should also be understood that a cluster architecture would typically have more than one (1) server and devices. In this example, server 122 has multiple interfaces of different types; another example might show multiple servers and devices, each with one or more interfaces of one or more types. For example, the disclosed technology may be employed to communicate with a computer-readable storage medium such as a physical disk. Computing system 102 and server 122 are communicatively coupled via connections 124, 126 and 128, although they could also be coupled through any number of communication mediums such as, but not limited to, the Internet (not shown). For the sake of simplicity only three (3) types of connections are illustrated. It should also be noted there are many possible computing systems and cluster system architecture configurations, of which computing system 102 and cluster infrastructure 100 are only simple examples. Further, for the sake of the following description, the terms such as "sending," "send side," "outgoing." "receiving," "receive side" and "incoming" are used from the perspective of application 120.

Figure 2:
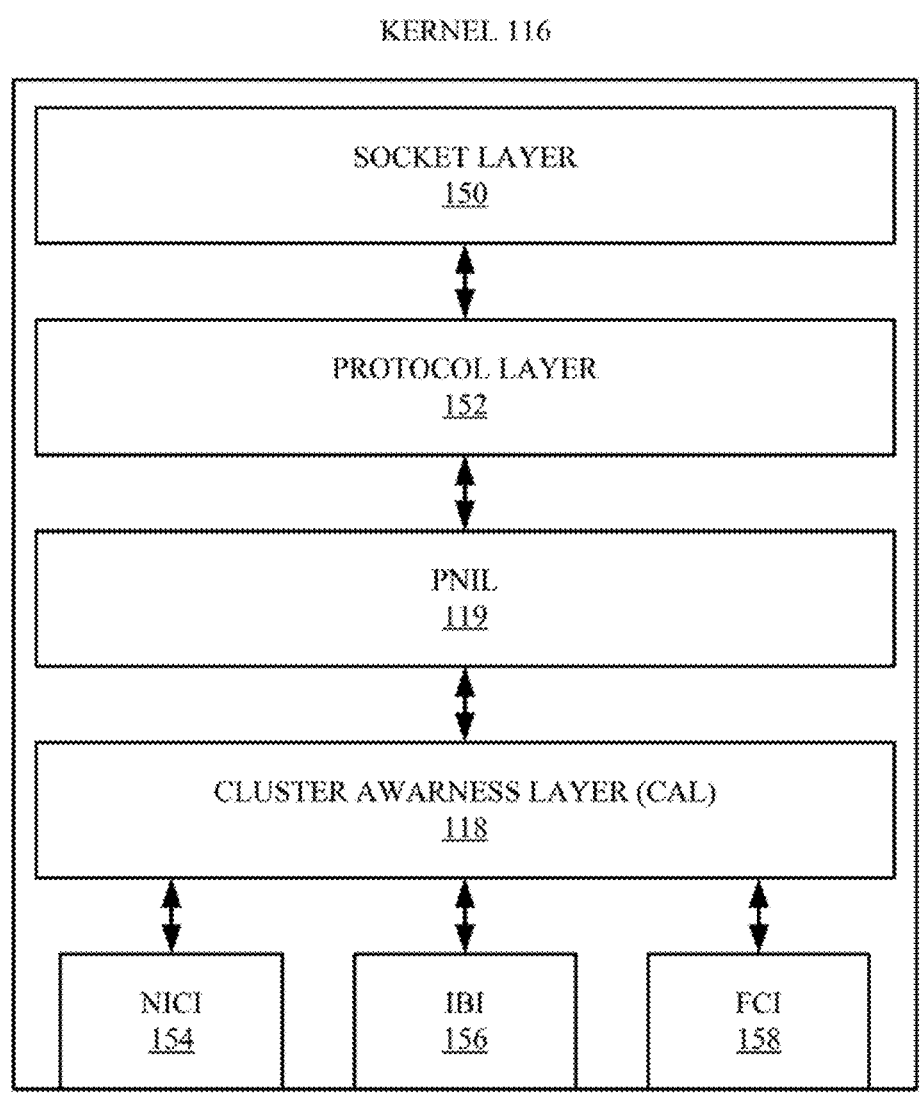
FIG. 2 is a block diagram of an operating system kernel configured in accordance with the claimed subject matter.

FIG. 2 is a block diagram of operating system kernel 116, first introduced above in FIG. 1, in more detail. As illustrated in FIG. 1, logic associated with kernel 116 and components 118 and 119 are stored on CRSM 112 and are executed on one or more processors (not shown) associated with CPU 104.

Kernel 116 includes a socket layer 150, a protocol layer 152, PNIL 119 (FIG. 1) and CAL 118 (FIG. 1). In addition, kernel 116 includes three (3) examples of possible hardware interfaces, i.e. a network interface card interface (NICI) 154, an InfiniBand Interface (IBI) 156 and a FiberChannel (FC) interface 158. In this example, NICI handles communication via Ethernet 124 (FIG. 1), IBI 156 handles communication via IB 126 (FIG. 1) and FCI 158 handles communication via FC 128 (FIG. 1). Components 118, 119, 150, 152, 154, 156 and 158 are used as examples for explaining the claimed subject matter through the rest of the Specification.

Kernel logic 117 (FIG. 1) is not shown in FIG. 2 and represents logic associated with kernel 116 that handles functionality associated with a typical kernel, which should be familiar to one with skill in the relevant arts. In addition, socket layer 150 and protocol layer 152 should be familiar to those with skill in the relevant arts. Cluster awareness layer 118 is responsible for being aware of other cluster awareness layers (not shown) on other nodes of cluster computing architecture 100 (FIG. 1). Cluster awareness layer 118 maintains communications with other cluster awareness layers, such as one on server 122, so that CAL 118 knows what clusters nodes are available and what communication protocols at each node is implemented and currently active. PNIL 119 and CAL 118 work together to implement the claimed subject matter, as described in more detail below in conjunction with FIGS. 3-6.

Figure 3:
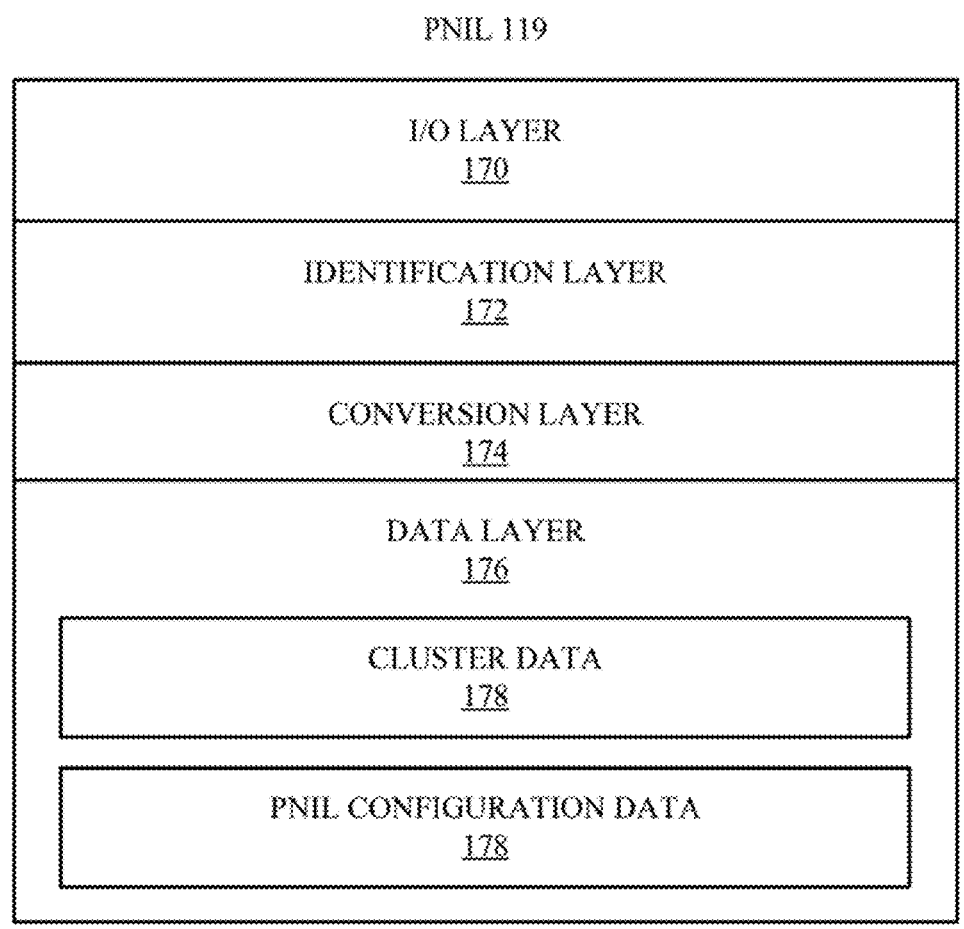
FIG. 3 is a block diagram of a Pseudo Network Interface Layer (PNIL) that implements the claimed subject matter.

FIG. 3 is a block diagram of a Pseudo Network Interface Layer (PNIL) 118, introduced in FIGS. 1 and 2, in more detail. PNIL 118 includes an Input/Output (I/O) layer 170, an Identification layer 172, a conversion layer 174 and a data layer 176. I/O layer 170 handles communication primarily between PNIL 170 and other layers of kernel 116 (FIGS. 1 and 2) such as socket layer 150 (FIG. 2), protocol layer 152 (FIG. 2) and cluster awareness layer 118 (FIG. 2). Identification layer 172 correlates packets on the receive side with particular IP addresses corresponding to applications such as application 120 (FIG. 1). Conversion layer 174 operates on both the sending and receiving side. On the sending side, conversion layer 174 constructs a cluster awareness (CA) header for an IP packet (see 264, FIG. 5) that identifies a particular destination node of the cluster and then hands the packet to I/O layer 170 to send to CAL 118 (FIGS. 1 and 2) for transmission to the appropriate node. On the receive side, conversion layer 174 removes a CA header from a packet (see 266, FIG. 5) received via CAL 118 from a node of the cluster and then hands the packet to I/O layer 170 to send to protocol layer 152 (FIG. 2) for delivery to the appropriate application.

Data layer 176 stores information for the operation of PNIL 118. Examples of such information include, but are not limited to, cluster data 178 and PNIL configuration data 178. Cluster data 178 is primarily information on the IP address of cluster nodes such as server 122. PNIL configuration data 178 stores configurable parameters that control the operation of PNIL 118. Examples of such parameters may include, but are not limited to, parameters the control node selection, network interface selection, timeout values and exception handling. Functionality associated with layers 170, 172, 174 and 176 are explained in more detail below in conjunction with FIGS. 4-6.

Figure 4:
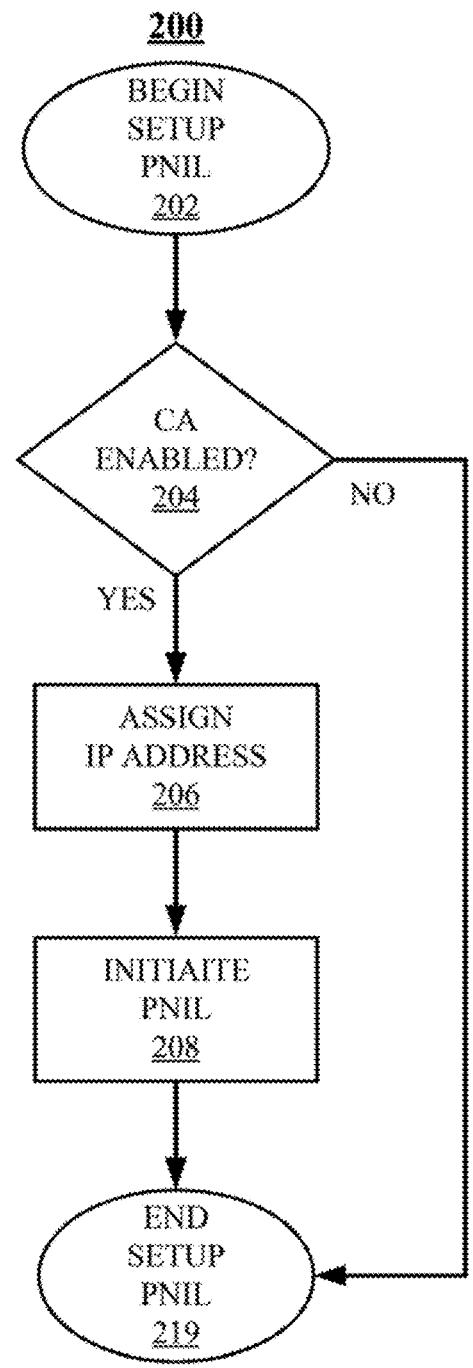
FIG. 4 is an example of a flowchart of a Setup PNIL process that implements aspects of the claimed subject matter.

FIG. 4 is an example of a flowchart of a Setup PNIL process 200 that implements aspects of the claimed subject matter. As explained above in conjunction with FIG. 1, process 200, as part of logic associated with PNIL 119 (FIGS. 1-3), is stored on CRSM 112 (FIG. 1) and executed on CPU 104 (FIG. 1).

Process 200 starts in a "Begin Setup PNIL" block 202 and proceeds immediately to a "CA Enabled?" block 204. During processing associated with block 204, a determination is made as to whether or not the system on which process 200 is executing is cluster awareness (CA) enabled. If so, during processing associated with an "Assign IP address" block 206, a specific IP address is assigned to identify packets that are to be transmitted in accordance with the claimed subject matter. The assigned IP address corresponds to an ifnet structure in a list of existing interfaces maintained by kernel 116 (FIGS. 1 and 2).

For example, existing structures may include various interfaces, e.g. "en0," "IB0" and "FC0" corresponding to Ethernet 124 (FIG. 1), IB 126 (FIG. 1) and FC 128 (FIG. 1), respectively. A structure corresponding to PNIL 119, eg. "c10," is also stored by kernel 116. If an application needs to exploit cluster aware communication in accordance with the claimed subject matter, a packet is addressed to the c10 interface, which in this example is associated with the IP address "10.1.1.10."

During processing associated with an "Initiate PNIL" block 208, an Operate PNIL process 300 (see FIG. 6) is initiated. Once Operate PNIL process 300 has been initiated or, if during processing associated with block 204, a determination is made that the system on which process 200 is executing is not CA enabled, control proceeds to an "End Setup PNIL" 219 during which process 200 is complete.

Figure 5:
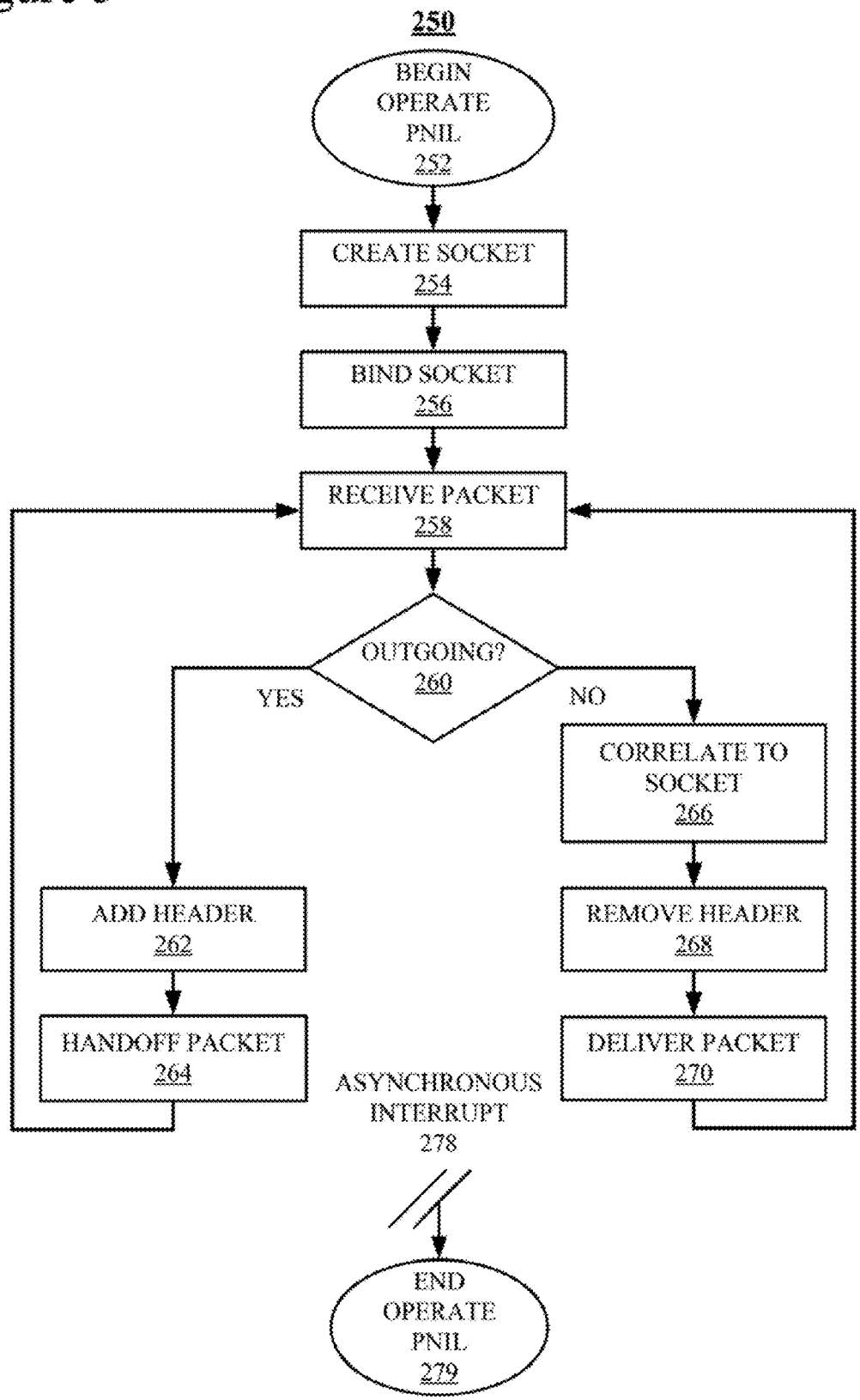
FIG. 5 is an example of a flowchart of an Operate PNIL process that implements aspects of the claimed subject matter.

FIG. 5 is an example of a flowchart of an Operate PNIL process 250 that implements aspects of the claimed subject matter, specifically the handling of a packet from, in this example, application 120 (FIG.) or CAL 118. Like process 200 (FIG. 4), in this example, logic associated with process 250 is stored on CRSM 112 (FIG. 1) and executed on CPU 104 (FIG. 1) (see 208, FIG. 4) as part of PNIL 119 (FIGS. 1-3)

Process 250 starts in a "Begin Operate PNIL" block 252 and proceeds to a "Create Socket" block 254. In this example, during processing associated with block 254, an internet protocol (IP) family socket is established between application 120 and PNIL 119. During processing associated with a "Bind Socket" block 256, the socket established during processing associated with block 254 is bound to the IP address assigned to PNIL 119, which as explained above in conjunction with FIG. 4, corresponds to a structure associated with PNIL 119, i.e. "c10" and "10.1.1.10."

During processing associated with a "Receive Packet" block 258, a packet is received for processing at PNIL 118. It should be noted that a packet may arrive at least two (2) different ways. An outgoing packet, addressed to the IP address "10.1.1.10," may be received via the socket established during processing associated with block 254. In addition, an incoming packet, addressed to application 120 may be received via CAL 118 and I/O layer 170 (FIG. 3). A packet via CAL 118 may be in any protocol associated with CAL 118, which in this example includes protocols associated with Ethernet 124 (FIG. 1), IB 126 (FIG. 1) and FC 128 (FIG. 1).

During processing associated with an "Outgoing?" block 260, a determination is made as to whether the packet received during processing associated with block 258 is outgoing, i.e. the packet is from application 120 with address "10.1.1.10," or incoming, i.e., application 120 is the intended recipient via CAL 118. It the packet is outgoing, during processing associated with an "Add Header" block 262, a CA header is added to the packet and, during a "Handoff Packet" block 264, the packet, with the CA header, is passed for delivery to CAL 118 (FIGS. 1 and 2) where the packet is handled in accordance with standard CAL 118 procedures. It should be noted that CAL 118 may determine which of the underlying protocols to utilize. The selection of a particular protocol may depend upon factors such as the availability and quality of any particular underlying hardware and configuration options. In this manner, the selection of a particular protocol is transparent to both application 120 and NPIL 119. Control then returns to Receive Packet block 258 and processing continues as described above.

If during processing associated with block 260 a determination is made that the packet is incoming, during processing associated with a "Correlate to Socket" 266, the packet is associated with, in this example the socket established during processing associated with block 254. The correlation enables PNIL 119 to handle multiple applications. During processing associated with a "Remove Header" block 268, a CA header is removed and, during processing associated with a "Deliver Packet" block 270, the packet, stripped of the CA header, is delivered to application 120 via the socket identified during processing associated with Correlate to Link block 266. It should be noted that typically CAL 118 handles packets other than those for PNIL 119 but that all packets to CAL 118 may be handled according to standard CAL procedures, i.e. the processing associated with PNIL 119 packets is transparent to CAL 118. Once a packet has been delivered during processing associated with block 270, control returns to Receive Packet 254 and processing continues as described above.

Finally, process 250 is halted by means of an asynchronous interrupt 278, which passes control to an "End Operate PNIL" block 279 in which process 250 is complete. Interrupt 278 is typically generated when the OS, kernel or computing system, etc. of which process 250 is a part is itself halted. During normal operation, process 250 continuously loops through the blocks 254, 256, 252, 258, 260, 262, 264, 266 and 268, processing packets as they are received.

Figure 6:
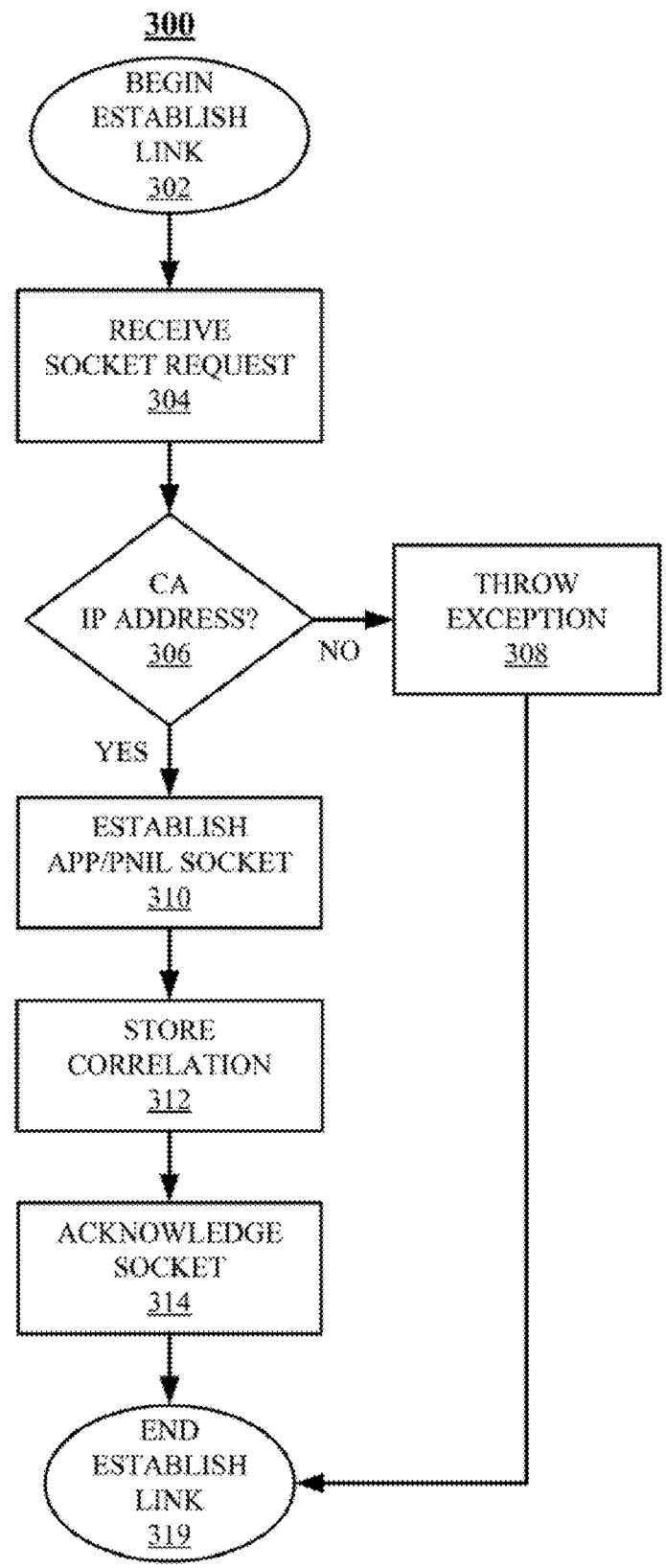
FIG. 6 is an example of a flowchart of an Establish Link process that implements aspects of the claimed subject matter.

FIG. 6 is an example of a flowchart of an Establish Socket process 300 that implements aspects of the claimed subject matter. Like process 200 (FIG. 4) and process 250 (FIG. 5), in this example, logic associated with process 300 is stored on CRSM 112 (FIG. 1) and executed on CPU 104 (FIG. 1) as part of PNIL 119 (FIGS. 1-3).

Process 300 starts in a "Begin Establish Link" block 302 and proceeds to a "Receive Socket Request" block 304. During processing associated with block 304, a request for a new socket is received from application 120 (FIG. 1) (see 256 FIG. 5). During a "CA IP Address" block 306, a determination is made as to whether the packet received during processing associated with block 304 corresponds to the IP address assigned to the request to be handled by CAL 118 (FIGS. 1 and 2) (see 206, FIG. 4). Typically, PNIL 119 would only receive packets so addressed. If a packet arrives without the designated IP address, control proceeds to a "Throw Exception" block 308, during which appropriate action is taken.

If, during block 306, a determination is made that the received request corresponds to the CA IP address, control proceeds to an "Establish APP/PNIL Socket" block 310. During processing associated with block 310, a standard socket is established between application 120 and PNIL 119. During processing associated with a "Store Correlation" block 312, information relating to the socket established during processing associated with block 310 is stored for future processing (see 260, FIG. 5). During processing associated with an "Acknowledge Socket" block 314, a signal is transmitted to application 120 to indicate a successful establishment of the socket. Finally, during processing associated with an "End Establish Link" block 319, process 300 is complete.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. An apparatus, comprising:
    a processor;
    a computer readable storage medium coupled to the processor;
    a cluster specific interface device connected to a plurality of communication channels, each channel corresponding to an underlying hardware;
    a pseudo interface device without an underlying communication hardware coupled to the cluster specific interface device; and
    logic, stored on the computer readable medium and executed on the processor, for:
        configuring the pseudo interface device with an interact protocol (IP) address;
        generating a first communication link between an application and the pseudo interlace device, wherein the first communication link is bound to the IP address;
        receiving at the pseudo interface device an application packet from the application on the first communication link;
        generating a cluster interface packet by converting the application packet to a protocol corresponding to the cluster specific interface device;
        generating a hardware specific packet corresponding to a particular one of the underlying hardware based upon the cluster interface packet; and
        transmitting the cluster interface packet via the cluster interface device to the particular hardware via the corresponding communication channel.

2. The apparatus of claim 1, wherein the protocol of the application packet is a different type of protocol than a protocol associated with the corresponding communication channel.

3. The apparatus of claim 1, the logic further comprising logic for:
  receiving at the cluster specific interface device an incoming packet on a particular channel of the channels corresponding to the underlying hardware;
  associating the incoming packet to the first communication link;
  generating an application packet by converting the incoming packet into a protocol associated with the first communication link; a
  delivering the application packet via the first communication link.

4. The apparatus of claim 1, wherein the first communication link is an internet protocol (IP) family socket.

5. The apparatus of claim 1 wherein each of the underlying communication hardware is one of:
  a physical disk;
  an Ethernet;
  an infiniBand;
  a fiber channel; and
  a storage network.

6. A computer programming product, comprising:
  a non-transitory computer-readable storage medium having computer readable code stored thereon, said computer-readable code which when loaded onto a processor and executed performs the following:
    providing a cluster specific interface device connected to a plurality of communication channels, each channel corresponding to an underlying hardware;
    coupling the cluster specific interface device to a pseudo interface device without an underlying communication hardware;
    configuring the pseudo interface device with an internet protocol (IP) address:
    generating a first communication link between an application and the pseudo interface device, wherein the first communication link is bound to the IP address;
    receiving at the pseudo interface device an application packet from the application on the first communication link;
    generating a cluster interface packet by converting the application packet to a protocol corresponding to the cluster specific interface device;
    generating a hardware specific packet corresponding to a particular one of the underlying hardware based upon the cluster interface packet: and
    transmitting the cluster interface packet via the cluster interface device to the particular hardware via the corresponding communication channel.

7. The computer programming product of claim 6, wherein the protocol of the application packet is a different type of protocol than a protocol associated with the corresponding communication channel.

8. The computer programming product of claim 6, the logic further comprising logic for:
  receiving at the cluster specific interface device an incoming packet on a particular channel of the channels corresponding to the underlying hardware;
  associating the incomming packet to the first communication link;
  generating an application packet by converting the incoming packet into a protocol associated the first communication link; and
  delivering the application packet via the first communication link.

9. The computer programming product of claim 6, wherein the first communication is an interact protocol (IP) family socket.

10. The computer programming product of claim 6, wherein each of the underlying communication hardware is one of:
  a physical disk;
  an Ethernet;
  an infiniBand;
  a fiber channel; and
  a storage network.

11. An operating system kernel, comprising:
  a non-transitory computer readable storage medium;
  a pseudo interface device without an underlying communication hardware coupled to the cluster specific interface device; and
  logic, stored on the computer readable medium for execution on a processor, for:
    coupling the pseudo interface device to a cluster specific interface device connected to a plurality of communication channels, each channel corresponding to an underlying hardware;
    configuring the pseudo interface device with an internet protocol (IP) address;
    generating a first communication link between an application and the pseudo interface device, wherein the first communication link is bound to the IP address;
    receiving at the pseudo interface device an application packet from the application on the first communication link;
    generating a cluster interface packet by converting the application packet to a protocol corresponding to the cluster specific interface device;
    generating a hardware specific packet corresponding to a particular one of the underlying hardware based upon the cluster interface packet; and
    transmitting the cluster interface packet via the cluster interface device to the particular hardware via the corresponding communication channel.

12. The operating system kernel of claim 11, wherein the protocol of the application packet is a different type of protocol than a protocol associated with the corresponding communication channel.

13. The operating system kernel of claim 11, the logic further comprising logic for:
  receiving at the cluster specific interface device an incoming packet on a particular channel of the channels corresponding to the underlying hardware;
  associating the incoming packet to the first communication link;
  generating an application packet by converting the incoming packet into a protocol associated with the first communication link; and
  delivering the application packet via the first communication link.

14. The operating system kernel of claim 11, wherein the first communication link is an internet protocol (IP) family socket.

15. The operating system kernel of claim 11, wherein each of the underlying commnication hardware is one of:
  a physical disk;
  an Ethernet;
  an infiniBand;
  a fiber channel; and
  a storage network.

16. A computer operating system kernel, comprising:
  a non-transitory computer readable storage medium;

a pseudo interface device without an underlying communication hardware coupled to the cluster specific interface device; and logic, stored on the computer readable medium for execution on a processor, for:
- coupling the pseudo interface device to a cluster specific interface device connected to a plurality of communication channels, each channel corresponding, to an underlying hardware;
- configuring the pseudo interface device with an internet protocol (IP) address;
- generating a first communication link between an application and the pseudo interface device, wherein the first communication link is bound to the IP address;
- receiving at the pseudo interface device an application packet from the application on the first communication link;
- generating a cluster interface packet by converting the application packet to a protocol corresponding to the cluster specific interface device;
- generating a hardware specific packet corresponding to a particular one of the underlying hardware based upon the cluster interface packet; and
- transmitting the cluster interface packet via the cluster interface device to the particular hardware via the corresponding communication channel.

17. The computer operating, system kernel of claim 16, wherein the protocol of the application packet is a different type of protocol than a protocol associated with the corresponding communication channel.

18. The computer operating system kernel of claim 16, the logic further comprising logic for:
- receiving at the cluster specific interface device an incoming packet on a particular channel of the channels corresponding to the underlying hardware;
- associating the incoming packet to the first communication link;
- generating an application packet by converting the incoming packet into a protocol associated with the first communication link; and
- delivering the application packet via the first communication link.

19. The computer operating system kernel of claim 16, wherein the first communication link is an internet protocol (IP) family socket.

20. The computer operating system kernel of claim 16, wherein each of the underlying communication hardware is one of:
- a physical disk;
- an Ethernet;
- an infiniBand;
- a fiber channel; and
- a storage network.

* * * * *